INVENTOR.
Herbert C. Rhodes
BY Otto Moeller
ATTORNEY

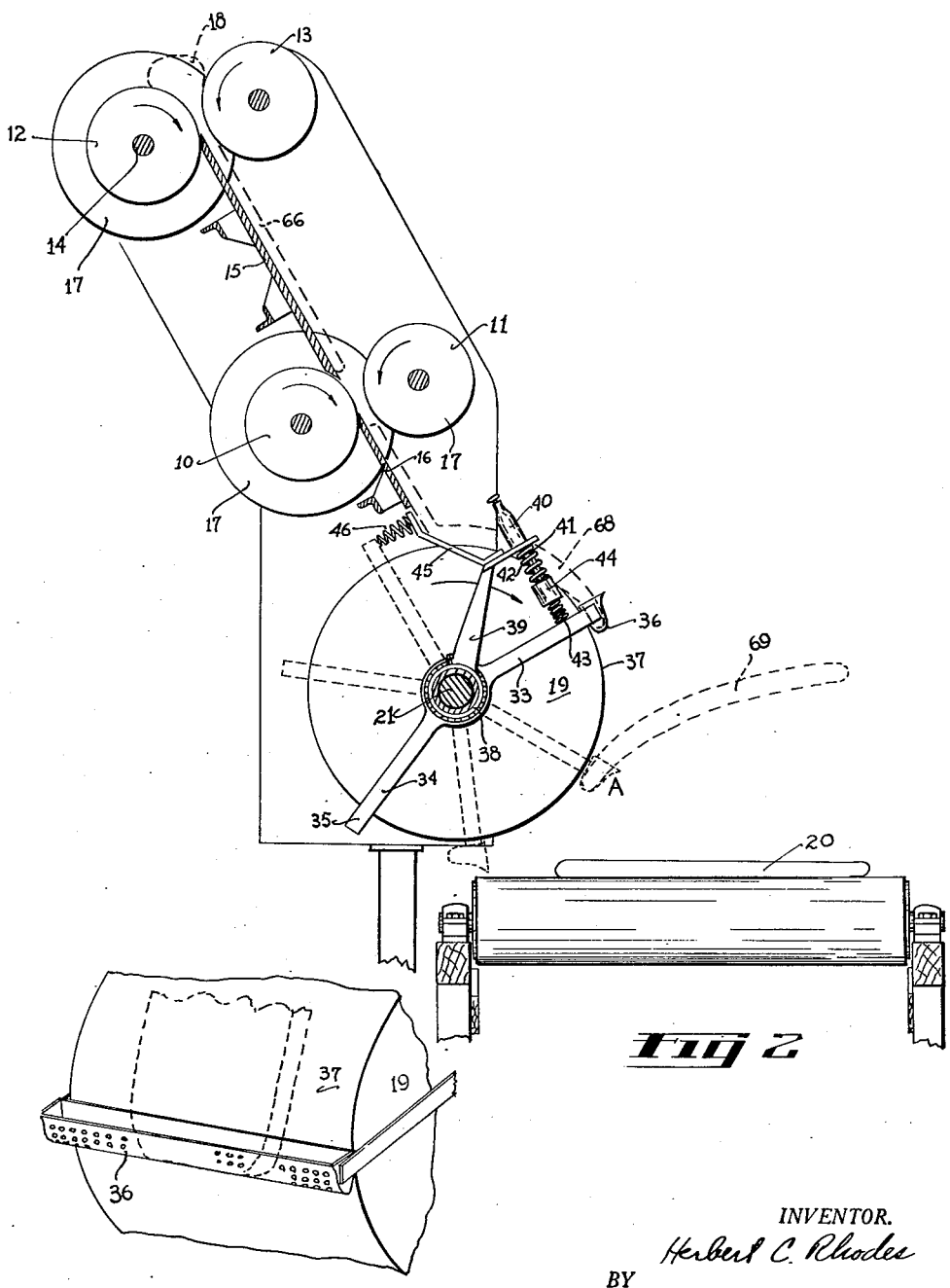

July 22, 1952
H. C. RHODES
2,604,057
APPARATUS FOR MAKING BREAD
Filed Feb. 28, 1949
4 Sheets-Sheet 3
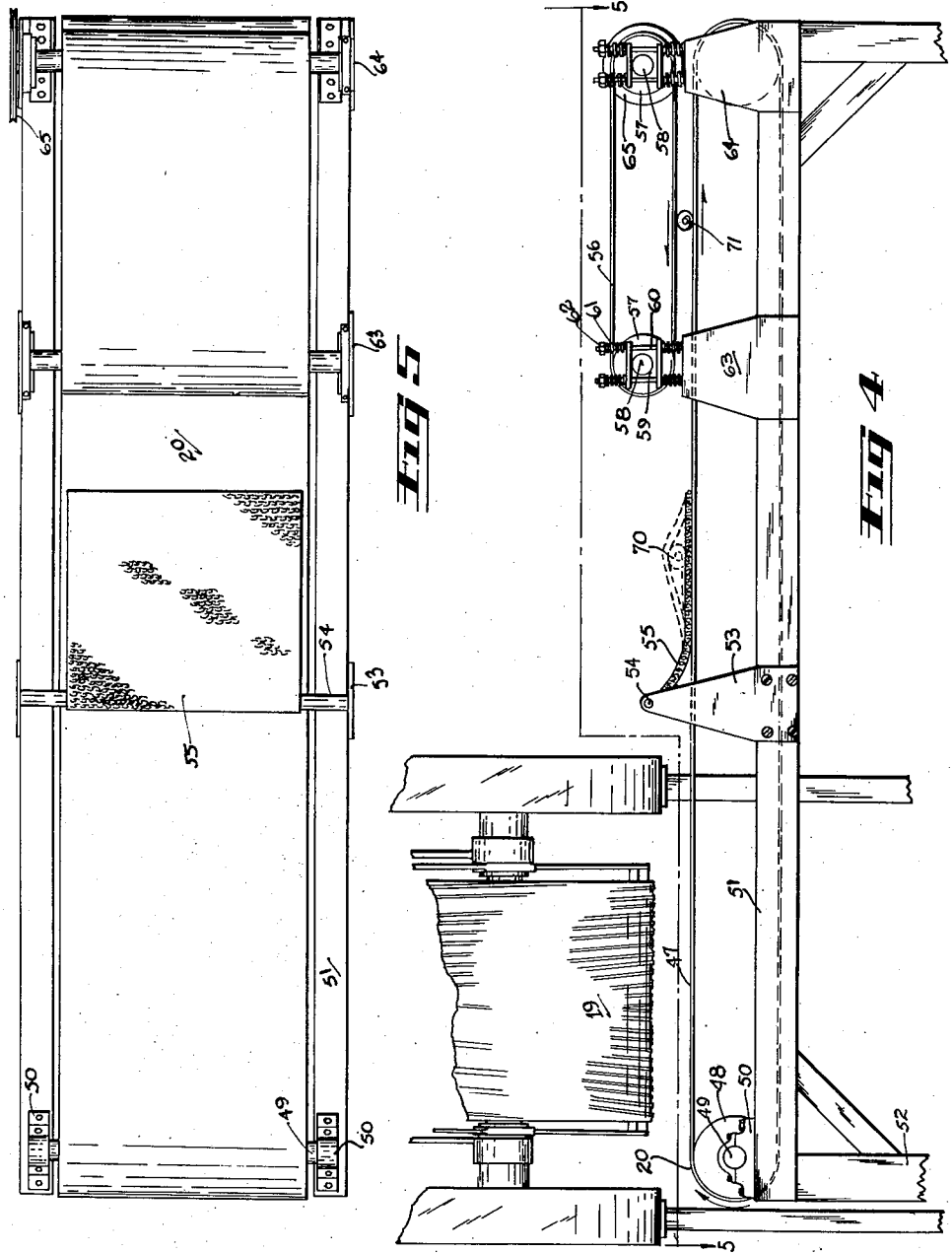
INVENTOR.
Herbert C. Rhodes
BY
Otto Moeller
ATTORNEY July 22, 1952 H. C. RHODES 2,604,057
APPARATUS FOR MAKING BREAD
Filed Feb. 28, 1949 4 Sheets-Sheet 4

INVENTOR.
BY Herbert C. Rhodes
Otto Moeller
ATTORNEY

Patented July 22, 1952

2,604,057

UNITED STATES PATENT OFFICE 2,604,057

APPARATUS FOR MAKING BREAD

Herbert C. Rhodes, Portland, Oreg., assignor to Read Standard Corporation, a corporation of Delaware Original application February 10, 1945, Serial No. 577,223, now Patent No. 2,534,734, dated December 19, 1950. Divided and this application February 28, 1949, Serial No. 78,705

4 Claims. (Cl. 107—12)

This invention relates generally to the bakers' art and particularly to an apparatus for making bread, and is a division of the parent case, Serial No. 577,223, filed February 10, 1945, now Patent Number 2,534,734 of December 19, 1950.

The main object of this invention is to provide an apparatus for preparing bread for pans preparatory to baking, in a manner that the texture thereof will be uniformly fine throughout and that all large voids will be eliminated.

The second object is to construct an apparatus by means of which a mass of dough may be thoroughly worked for the purpose of extracting the air therefrom and rendering uniform throughout the texture of the loaf when finally baked.

The third object is to construct a device of the class described which can be made as an attachment for existing types of dough molders or loaf forming machines.

I accomplish these and other objects in a manner set forth in the following specifications as illustrated in the accompanying drawings, in which:

Fig. 2 is a broken section taken along the line 2—2 in Fig. 1.

Fig. 3 is a fragmentary perspective of the loaf shortening stop.

Fig. 4 is a front elevation of the loaf rolling portion of the device.

Fig. 5 is a horizontal section taken along the line 5—5 in Fig. 4.

Like numbers of reference refer to the same or similar parts throughout the several views.

Figure 1:
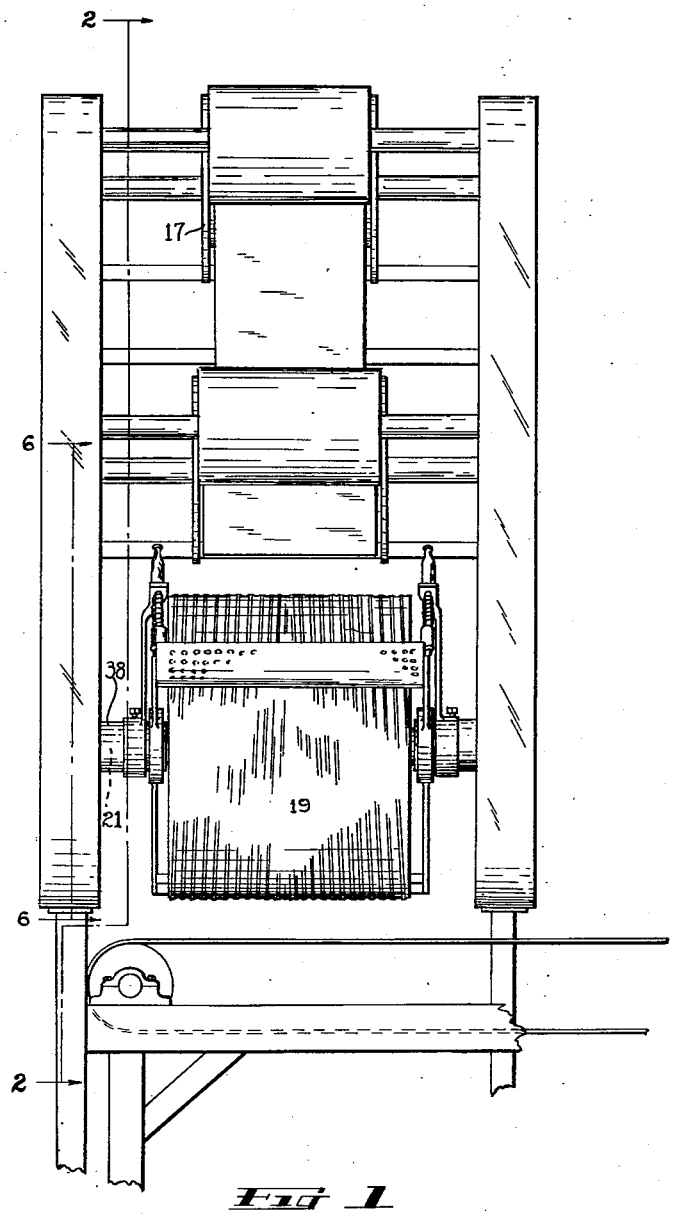
Fig. 1 is a front elevation of the device.
Figure 7:
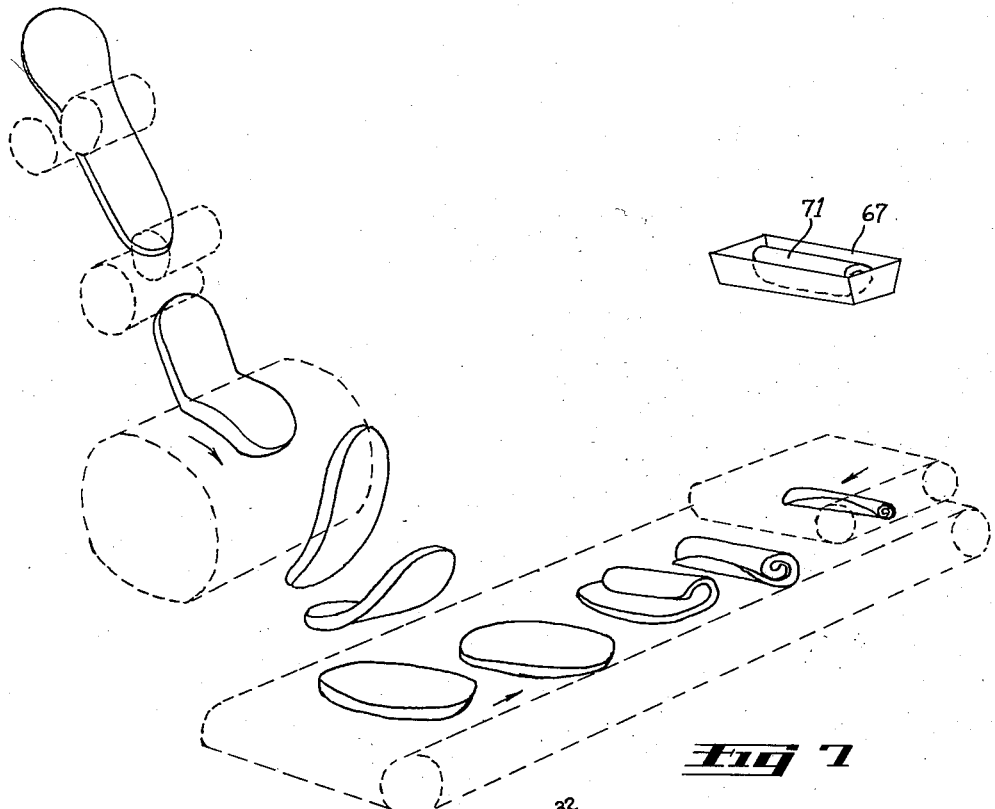
Fig. 7 is a somewhat diagrammatic perspective view showing a piece of dough in various stages of its travel through the steps of the process.

Referring in detail to the drawing, there is shown only those portions of the loaf preparing machine as are pertinent to this invention, and this consists of the live rollers 10, 11, 12 and 13 which are mounted on their respective shafts such as the shaft 14 and driven in any desired manner. Between the rollers 10 and 12 and below the rollers 10 are the plates 15 and 16, over which the dough can pass during and after the time it passes through the rollers 10 to 13 inclusive. Suitable guides 17 are placed along the sides of the rollers 10 and 12 to limit the width to which the dough 18 can be rolled. The mechanism thus far described is commonly formed on existing types of loaf forming machines.

Figure 6:
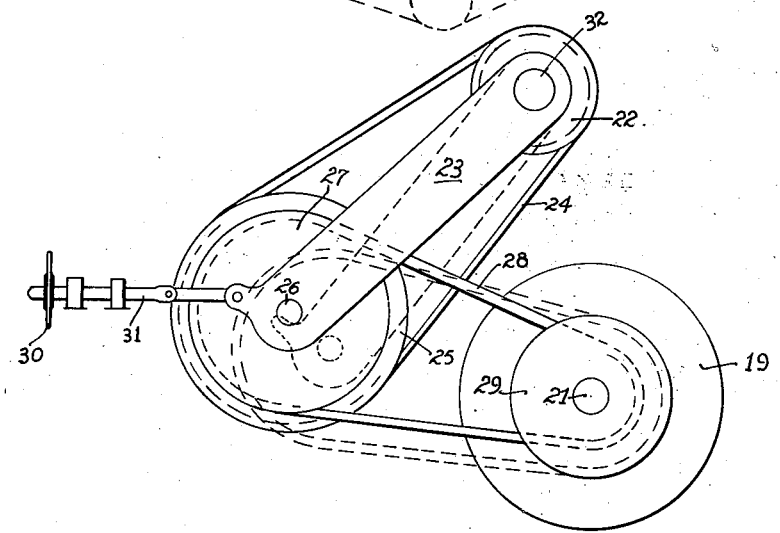
Fig. 6 is a side elevation of the speed changing device.

Referring particularly to my invention, same will be seen to consist of a loaf shortening drum 19 and a conveyor 20. The drum 19 is mounted on the shaft 21 of a variable speed drive mechanism similar to that shown in Fig. 6 in which power is supplied from the pulley 22, which is mounted on one end of an arm 23 through the belt 24 to the sheave 25, which is mounted on the opposite end of the arm 23. The sheave 25 is mounted on the same shaft 26 as is the variable speed sheave 27, whose belt 28 passes around the variable speed sheave 29 on the shaft 21. The belt 28 is kept in tension by means of the tightener 30 operating on the rod 31, which is attached to the arm 23. The arm 23 is capable of swinging about the center of the shaft 32.

Such contrivances are common in the market, a popular form of which is known as the Reeves variable speed drive, which operates on the principle of changing the pitch line of the driving and driven pulleys. No claim is made to this element and the explanation is given merely to show a form of variable speed drive for the shaft 21.

Mounted on the shaft 21 are the radial arms 33, to which are attached the counter balance arms 34, the ends of which are joined by the counter balance 35. The ends 33 are joined by the perforated trough 36, which is free to move with relation to the surface 37 of the drum 19. The shaft 21 is contained within the tubular bearing 38, on which are mounted a pair of arms 39 which support the dash pots 40 in which are disposed the pistons 41, which are outwardly urged by the springs 42. A spring 43 is interposed between the piston head 44 and its respective arm 33.

Also secured to the arms 39 are the brackets 45, which carry the rebound springs 46, against which the counter weight 35 strikes when the trough 36 reaches its lowermost point of travel.

In Figs. 4 and 5 are shown the conveyor 20, preferably of fabric and mounted on the rollers 48, to which motion is imparted through any convenient source (not shown). The rollers are mounted on the shaft 49 and are supported by the bearings 50 which, in turn, are mounted on the base 51 and held at an elevation by the supports 52 which will bring the top run of the conveyor 20 just below the bottom of the drum 19. On the base 51 are secured the vertical brackets 53, across which is mounted a rod 54, to which is attached a flexible wire cloth 55 which lies upon the conveyor 20.

Toward the discharge end of the conveyor 20 and directly above same is a loaf shaping belt 56, between whose lower run and the conveyor 20 the loaf is rolled as it is discharged from the conveyor 20. The belt 56 is carried on the rollers 57, whose shafts 58 journal in the spring mounted bearings 59, which are slidable on the bolts 60, on whose upper ends are placed the spring 61, which is held down by the nuts 62. By this arrangement, the pressure of the belt 56 can be regulated to a nicety.

The bolts 60 are supported by the brackets 63 and 64 on the sides of the base 51. A drive pulley 65 is secured on a shaft 58 and power is supplied thereto from a convenient source (not shown).

The operation of the device is as follows: Assuming that dough has been formed into pieces of the correct weight to produce the desired loaf of bread, and that the chunk of dough 18 has been presented to the rollers 12 and 13, between which it is forced to pass by the rotation of these rollers, it follows that the dough will be flattened out into a long narrow strip 66, and this will be found to be much longer than the pan 67 into which it is finally to be placed ready for baking. It is, however, confined to a given width by the guides 17 until it finally contacts the surface 37 of the slower moving drum 19. This slower movement serves to thicken the dough 68 which finally engages the trough 36, which being free to turn, is carried around thereby to the position shown as "A" in Fig. 2.

The sheeting rolls 10—11 and 12—13 are so spaced with respect to one another as to engage a mass of dough 18 and compress same into a relatively thin dough sheet 66. By maintaining the rolls 10—11 and 12—13 in closely spaced relation the dough sheet 66 is, during the sheeting operation, formed with a uniformly smooth texture which is obtainable only through a thorough and complete de-gasing of the dough sheet. It is through the action of the rolls 10—11 and 12—13 that an elongated dough sheet 66 is obtained, which sheet is elongated to such a length that it would not fit within the baking pan. When the dough sheet 66 emerges from the sheeting rolls 10—11 and engages the peripheral surface 37 of the drum 19 the rate of movement of said drum will tend to shorten the dough sheet 66. The shortening of the dough sheet 66 upon its engagement with the drum 19 is due to the difference in rate of speed between the drum 19 and sheeting rolls 10—11. The forward or leading edge of the dough sheet 66 is adapted to engage the surface 37 of the drum 19 while the rear end or trailing portion of the dough sheet is still engaged by the rollers 10—11. Thus as the leading edge of the dough sheet engages the drum 19 the difference in rate of speed between the drum 19 and the rollers 10—11 will produce a shortening or backing up of the dough sheet as it is carried around by the drum 19. That is, the difference in the rate of speed of the drum 19 and the rollers 10—11 will cause the dough sheet 66 to back up or spread out and the elongated dough sheet will be shortened from its leading to its trailing edge as the entire dough sheet finally engages the surface 37 of the drum 19.

The trough 36 carried by the arms 33 is adapted to move independently with respect to the rotating drum 19. As shown in Figure 2, the leading edge of the dough sheet 66 engages the trough 36 which engagement subjects the leading edge of the dough sheet to a pressure which is in a direction opposite to the direction of movement of the dough sheet. That is, at the time of engagement of the leading edge of the dough sheet with the trough 36 the counter balance weights 35 will prevent the trough from moving around the surface of the drum 19 and the trough 36 will remain in this position until a sufficient amount of the dough sheet has been carried forward by the drum 19 to overcome the counter balance 35, at which time the trough 36 will start to move around the surface of the drum 19. During this period of non movement by the trough 36 the leading edge of the dough sheet will tend to be squared up as it engages the trough 36 and pressure will be directed to the dough sheet by means of the trough 36 and the counter balance 35 which pressure will tend to shorten still further the dough sheet 66. In fact the shortening of the dough sheet by the trough 36 and counter balance 35 will tend not only to square up the leading edge of the dough sheet but also the trailing edge. Before the trough 36 starts to move around the periphery 37 of the drum 19 there must be a sufficient amount of the dough sheet supported by said trough before the action of the counter balance 35 can be overcome, and it is during this period that a pressure is imparted to the dough sheet in a direction opposite to the line of travel of the dough sheet that causes the dough sheet to be shortened.

As the trough 36 starts to move about the peripheral surface 37 of the drum 19 the trailing or rear end portion of the dough sheet 66 is still in engagement with the drum 19. As the drum 19 continues to rotate and carries the trailing or rear end portion of the dough sheet the trough is forced about the surface 37 of the drum 19 due to the weight of the dough sheet which is being supported by said trough. At approximately the position designated as "A" in Figure 2, the trailing or rear end portion of the dough sheet will be thrown from the peripheral surface 37 of the drum 19 towards the conveyor 20. During this action the trough 36 will continue to move about the drum's surface so that when the dough sheet, through the flipping action, assumes approximately a horizontal position the leading edge of the dough sheet will leave the trough 36 so that the entire dough sheet will be deposited upon the conveyor 20. After the dough sheet leaves the trough 36 the counter balance 35 will cause the trough to be returned to its original or starting position, such as shown in full lines in Figure 2, where said trough will be ready to engage the next sheet of dough that is carried by the surface 37 of the drum 19.

The dough sheet upon engaging the conveyor 20 is carried along in a direction normal to its length until it passes under the wire cloth 55 and is formed into a somewhat imperfect roll 70, which is, however, the correct pan length. When the roll 70 escapes from the end of the wire cloth 55, it passes under the belt 56 and is rolled to cylindrical form, from whence it is discharged onto a table or conveyor (not shown), and put into pans 67 ready for the oven. The unbaked loaf 71 will be found, upon examination, to have the form of a true cylinder of uniform texture throughout and devoid of irregularities in the air pocket sizes. It will readily be seen that an important feature of the device is the ability to shorten the strip to pan length after it has been rolled to an excessive length, and this is accomplished by controlling the relative speeds of the rollers 10 to 14 inclusive, with regard to the surface speed of the drum 19, and also the action of the trough 36 in imparting or subjecting the dough sheet to a pressure from the leading to the trailing edge for further shortening said dough sheet.

I am aware that numerous minor changes in details can be employed without departing from the spirit of this invention. It is, therefore, not my intention to be limited to the precise form shown herein, but I do intend to cover such forms and modifications of the device as fall fairly within the appended claims.

I claim:

1. An apparatus of the class described, consisting of rollers for forming a mass of dough into a thin flat strip, a drum disposed beneath the discharge of said rollers having a lesser peripheral speed than do said rollers, a stop member disposed along the surface of said drum mounted for swinging movement independently of said drum about an axis concentric with the axis of said drum to engage said strip of dough and to be carried thereby around said drum until said strip becomes inverted and falls from said drum.

2. A drum for machines of the class described, consisting of a cylinder mounted for rotation about a horizontal axis, a stop member mounted along the descending peripheral surface of said cylinder for swinging movement independently of said cylinder about an axis concentric with the axis of said cylinder, a counter balance for said stop member for normally holding said trough in a predetermined position along the descending peripheral surface of said cylinder, and cushioning means disposed at the said normal position of said stop member for absorbing the rebounding shocks of said trough.

3. In a device of the class described, the combination of a plurality of feed rollers, plates and side guides for forming a mass of dough into an elongated flat strip, together with a dough strip shortening drum, mounted on a horizontal axis and adapted to receive a strip of dough as it is discharged by said rollers, means for regulating the surface speed of said drum with relation to the surface speed of said rollers, a trough-like stop disposed along the descending peripheral surface of said drum in the path of the member normally moving around said drum, said trough-like member being mounted for swinging movement independently of said drum about an axis concentric with the axis of said drum, means for counter balancing said trough in a manner that it will normally seek a predetermined position on said drum, and shock absorbers disposed at the opposite limits of travel of said trough.

4. An apparatus of the class described comprising rollers for forming a mass of dough into a thin flat sheet, a drum disposed beneath the discharge of said rollers mounted for rotation about a horizontal axis, a stop member normally disposed along the upper surface portion of said drum and mounted for swinging movement independently of said drum about an axis concentric with the axis of said drum, said stop member being disposed to be engaged by a sheet of dough and to be moved thereby around said drum until said strip becomes inverted and falls from said drum, and means for returning said stop member to said normal position.

HERBERT C. RHODES.

REFERENCES CITED

The following references are of record in the file of this patent:

UNITED STATES PATENTS

| Number | Name | Date |
|---|---|---|
| 787,274 | Burns | Apr. 11, 1905 |
| 1,790,589 | McCarthy | Jan. 27, 1931 |
| 2,034,346 | Lauterbur | Mar. 17, 1936 |
| 2,373,012 | Burdett et al. | Apr. 3, 1945 |